(12) United States Patent
Sadamitsu

(10) Patent No.: US 10,837,354 B2
(45) Date of Patent: Nov. 17, 2020

(54) MANUFACTURING METHOD FOR TURBOCHARGER

(71) Applicant: TOYOTA JIDOSHA KABUSHIKI KAISHA, Toyota (JP)

(72) Inventor: Takahiro Sadamitsu, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 180 days.

(21) Appl. No.: 16/117,495

(22) Filed: Aug. 30, 2018

(65) Prior Publication Data
US 2019/0112972 A1 Apr. 18, 2019

(30) Foreign Application Priority Data

Oct. 18, 2017 (JP) .................................. 2017-201989

(51) Int. Cl.
*F02B 37/18* (2006.01)
*F02C 6/12* (2006.01)

(52) U.S. Cl.
CPC .............. *F02B 37/186* (2013.01); *F02C 6/12* (2013.01); *F05D 2220/40* (2013.01); *F05D 2220/60* (2013.01); *F05D 2230/60* (2013.01)

(58) Field of Classification Search
CPC . F02B 37/186; F05D 2220/60; F05D 2220/40
See application file for complete search history.

(56) References Cited

U.S. PATENT DOCUMENTS 5,046,317 A * 9/1991 Satokawa ............. F01D 17/105
60/602
2015/0044033 A1 2/2015 Murayama

FOREIGN PATENT DOCUMENTS

| JP | 2014-005789 A | 1/2014 |
|----|---------------|--------|
| JP | 2016-160828 A | 9/2016 |

* cited by examiner

*Primary Examiner* — Jason L Vaughan
*Assistant Examiner* — Amanda Kreiling
(74) *Attorney, Agent, or Firm* — Oliff PLC

(57) ABSTRACT

The manufacturing method for a turbocharger includes: connecting a shaft-side member to an actuator while the shaft-side member is inserted into a bush; combining the shaft-side member with a valve body-side member; and fixing the shaft-side member to the valve body-side member in a state where a wastegate valve is driven by the actuator so as to close the wastegate valve, and a contact surface of the valve body is pressed against a bearing surface.

3 Claims, 5 Drawing Sheets

US 10,837,354 B2

MANUFACTURING METHOD FOR TURBOCHARGER

INCORPORATION BY REFERENCE

The disclosure of Japanese Patent Application No. 2017-201989 filed on Oct. 18, 2017 including the specification, drawings and abstract is incorporated herein by reference in its entirety.

BACKGROUND

1. Technical Field

The disclosure relates to a manufacturing method for a turbocharger.

2. Description of Related Art

Japanese Unexamined Patent Application Publication No. 2014-5789 (JP 2014-5789 A) discloses a turbocharger provided with a wastegate valve that includes a shaft driven by an actuator, and a valve body that comes into contact with a bearing surface and closes a wastegate port. In the turbocharger, the valve body and the shaft are welded to each other in a state where a contact surface of the valve body is brought into contact with the bearing surface in order to eliminate a gap between the valve body and the bearing surface caused by manufacturing tolerance.

SUMMARY

There is a gap between a bush supporting the shaft, and the shaft in order to allow the shaft to revolve. Therefore, even when the shaft and the valve body are fixed to each other in the state where the contact surface of the valve body is brought into contact with the bearing surface and a gap caused by manufacturing tolerance is eliminated as described above, the shaft can be tilted inside the bush as the actuator is driven to drive the wastegate valve and cause displacement of the valve body.

A turbocharger to which a manufacturing method for a turbocharger according to the disclosure is applied includes a wastegate valve. The wastegate valve includes a shaft-side member and a valve body-side member. The shaft-side member includes a shaft that is supported by a bush provided in a turbine housing so that the shaft is able to revolve. The valve body-side member includes a valve body that sits on a bearing surface of the turbine housing and closes a wastegate port. In the turbocharger, the wastegate valve is configured to open and close as the shaft-side member is driven by an actuator that is provided outside the turbine housing. The manufacturing method for the turbocharger includes: connecting the shaft-side member to the actuator while the shaft-side member is inserted into the bush; combining the shaft-side member with the valve body-side member; and fixing the shaft-side member to the valve body-side member in the state where the wastegate valve is driven by the actuator so as to close the wastegate valve and a contact surface of the valve body is pressed against the bearing surface.

With the manufacturing method, the shaft-side member and the valve body-side member are fixed to each other in the state where the shaft is tilted inside the bush as the actuator is driven, and the contact surface of the valve body is pressed against the bearing surface. Therefore, the shaft-side member and the valve body-side member are fixed to each other in the same positions as those when the actuator is driven to close the wastegate valve. Hence, even if there were gaps among parts including a gap between the bush and the shaft and manufacturing tolerance, it is possible to assemble the wastegate valve in a state where gaps thus caused are eliminated.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
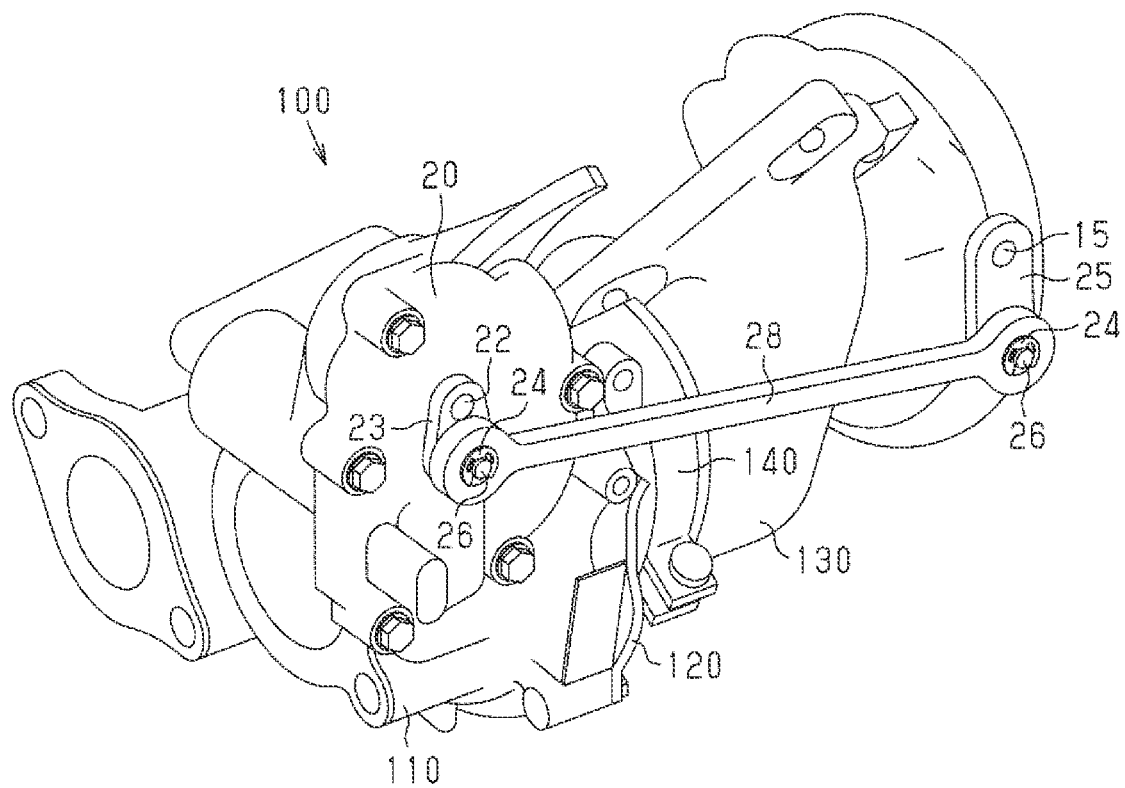
FIG. 1 is a perspective view of a turbocharger.

An embodiment of a turbocharger and a manufacturing method for the turbocharger is described below with reference to FIG. 1 to FIG. 7. As shown in FIG. 1, a turbocharger 100 is structured by combining a compressor housing 110, a bearing housing 120, and a turbine housing 130. The compressor housing 110 is a housing that accommodates a compressor wheel, and the turbine housing 130 is a housing that accommodates a turbine wheel. The bearing housing 120 is a housing that supports a connecting shaft that connects the compressor wheel and the turbine wheel.

The bearing housing 120 is fastened to the compressor housing 110 by bolts. The turbine housing 130 is assembled to the bearing housing 120 by a clamp 140.

Figure 2:
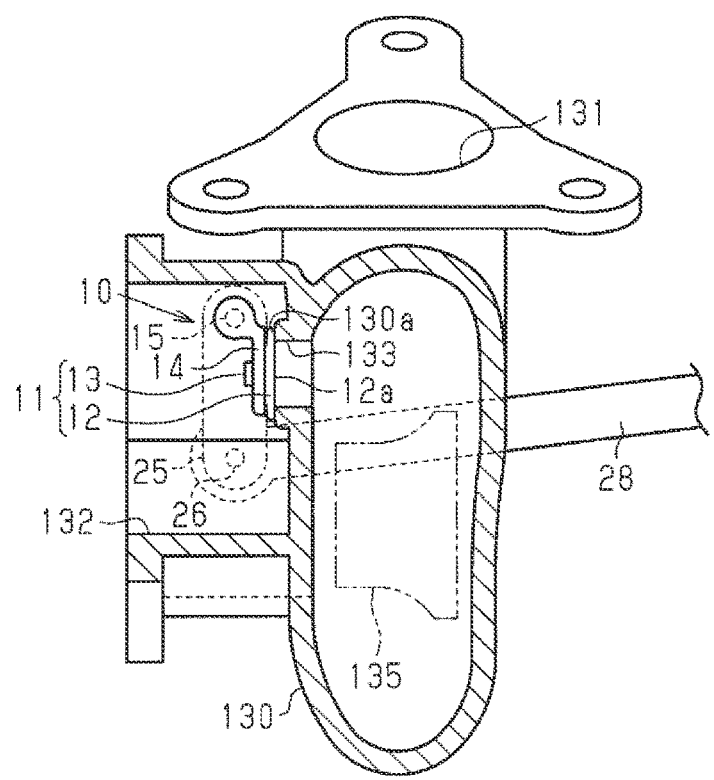
FIG. 2 is a partial sectional view of a turbine housing.

As shown in FIG. 2, a turbine wheel 135 is accommodated in the turbine housing 130, and a scroll passage 131 is formed in the turbine housing 130. The scroll passage 131 extends so as to surround the turbine wheel 135. Exhaust gas that passes in the scroll passage 131 and is blown on the turbine wheel 135 is discharged to an exhaust gas passage from the turbine housing 130 through a discharge passage 132.

In the turbocharger 100, as exhaust gas that passes in the scroll passage 131 is blown onto the turbine wheel 135, the turbine wheel 135 rotates. As the turbine wheel 135 rotates, the compressor wheel connected with the turbine wheel 135 through the connecting shaft rotates, and supercharging of intake air happens.

As shown in FIG. 2, the turbine housing 130 is provided with a wastegate port 133. The wastegate port 133 is a passage that circumvents the turbine wheel 135 and connects the scroll passage 131 and the discharge passage 132 with each other, and allows exhaust gas to flow while circumventing the turbine wheel 135. The wastegate port 133 has a circular section.

The turbocharger 100 includes a wastegate valve 10. The wastegate valve 10 has a disc-shaped valve plate 12 that closes the wastegate port 133, and the wastegate valve 10 revolves around a shaft 15 so as to open and close the wastegate port 133. The shaft 15 is supported by a bush provided in the turbine housing 130 so that the shaft 15 is able to revolve.

As shown in FIG. 2, when the valve plate 12 is in contact with a bearing surface 130a of the turbine housing 130, the wastegate port 133 is closed by a contact surface 12a of the valve plate 12. Meanwhile, when the contact surface 12a of the valve plate 12 is separated from the wastegate port 133 and the wastegate port 133 is open, in other words, when the wastegate valve 10 is open, exhaust gas that has passed in the scroll passage 131 flows into the discharge passage 132 through the wastegate port 133. As exhaust gas that has passed in the scroll passage 131 flows into the discharge passage 132 through the wastegate port 133, an amount of exhaust gas blown onto the turbine wheel 135 is reduced. Therefore, when the wastegate valve 10 is open, rotation of the turbine wheel 135 and the compressor wheel is restrained, thus restraining supercharging.

In the turbocharger 100, the shaft 15 of the wastegate valve 10 goes through the turbine housing 130 and extends to an outer side of the turbine housing 130. As shown in FIG. 1 and FIG. 2, a plate-shaped wastegate-side link arm 25 is fixed to a distal end portion of the shaft 15 projecting to the outer side of the turbine housing 130. A columnar connecting pin 26 is fixed at a position that is separated from the portion of the wastegate-side link arm 25 where the shaft 15 is fixed so that the center axis of the connecting pin 26 becomes parallel to the center axis of the shaft 15.

Also, as shown in FIG. 1, an actuator 20 for driving the wastegate valve 10 is fixed to the compressor housing 110. A motor is incorporated in the actuator 20 and drives a rotating shaft 22. A plate-shaped actuator-side link arm 23 is fixed to the rotating shaft 22. The connecting pin 26 is fixed at a position separated from the portion of the actuator-side link arm 23 where the rotating shaft 22 is fixed so that the center axis of the connecting pin 26 becomes parallel to the center axis of the rotating shaft 22.

In the turbocharger 100, a driving rod 28 connects the actuator-side link arm 23 and the wastegate-side link arm 25 with each other. In both end portions of the driving rod 28, through-holes are provided, respectively. A diameter of each of the through-holes is slightly larger than a diameter of each of the connecting pins 26. A first end of the driving rod 28 is assembled to the wastegate-side link arm 25 by inserting the connecting pin 26 into the through-hole, and an E-ring 24 is fitted into a groove provided in a distal end portion of the connecting pin 26, thus retaining the first end of the driving rod 28.

A second end of the driving rod 28 is assembled to the actuator-side link arm 23 by inserting the connecting pin 26 into the through-hole, and the E-ring 24 is fitted into a groove provided in a distal end portion of the connecting pin 26, thus retaining the second end of the driving rod 28.

Hence, when the actuator 20 drives the rotating shaft 22 and the actuator-side link arm 23 revolves around the rotating shaft 22, driving force of the actuator 20 is transmitted to the wastegate-side link arm 25 through the driving rod 28. Then, the wastegate-side link arm 25 revolves around the shaft 15, and the wastegate valve 10 is driven to move closer to or away from the wastegate port 133. In the turbocharger 100, it is possible to open and close the wastegate port 133 by driving the actuator 20 as described above.

Figure 3:
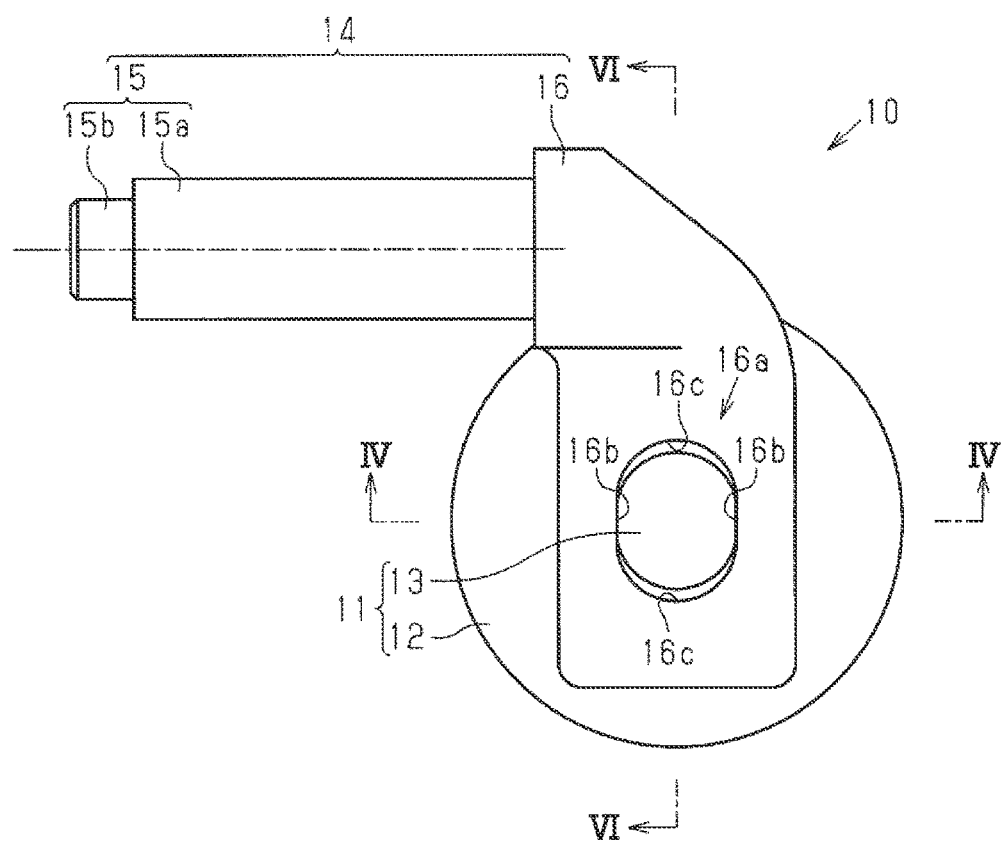
FIG. 3 is a top view of a wastegate valve.
Figure 4:
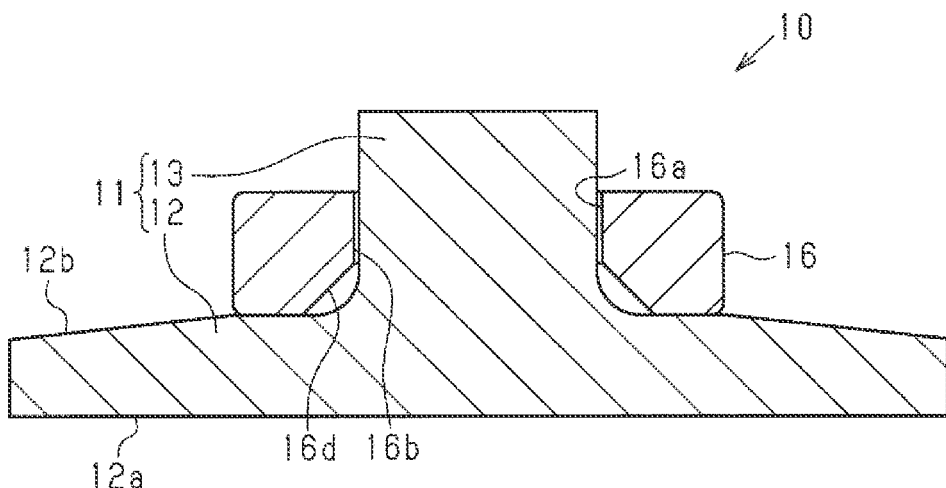
FIG. 4 is a sectional view taken along the arrows IV-IV in FIG. 3.

Next, with reference to FIG. 3 and FIG. 4, a structure of the wastegate valve 10 is described in detail. As shown in FIG. 3, the wastegate valve 10 is made by assembling a valve body 11 to a swing arm 14 provided with the shaft 15. The valve body 11 is assembled to a lever 16 of the swing arm 14.

The lever 16 connected with the shaft 15 is curved, and a portion of the lever 16 on the opposite side from the portion of the lever 16 connected with the shaft 15 has a plate shape. The valve body 11 is fixed to the plate-shaped portion, and the portion where the valve body 11 is fixed is at a position that is shifted from the center axis of the shaft 15 in a direction orthogonal to the center axis.

Further, the shaft 15 includes a large diameter portion 15a connected with the lever 16, and a small diameter portion 15b having a diameter smaller than that of the large diameter portion 15a. The large diameter portion 15a and the small diameter portion 15b are connected with each other so that the center axes thereof coincide with each other. In the turbocharger 100, the large diameter portion 15a of the shaft 15 is supported by the bush fitted into the turbine housing 130 so that the large diameter portion 15a is able to revolve. Then, wastegate-side link arm 25 is fixed to the small diameter portion 15b projecting to the outer side of the turbine housing 130. Thus, the wastegate valve 10 revolves around the shaft 15, and the valve body 11 thus opens and closes the wastegate port 133.

As shown in FIG. 4, the valve body 11 is fixed to the lever 16 in a state where a valve stem 13 is inserted into a through-hole 16a provided in the lever 16. The valve stem 13 extends from a back surface 12b of the valve plate 12 perpendicularly to the valve plate 12. The back surface 12b is on the opposite side of valve plate 12 from the contact surface 12a. The valve stem 13 is provided in the center of the valve plate 12.

As shown in FIG. 3, the through-hole 16a includes two curved surface portions 16c and two planar portions 16b. The two planar portions 16b link these two curved surface portions 16c and are parallel to a plane orthogonal to the center axis of the shaft 15. The curved surface portions 16c are semicircular curved surfaces that are projecting outwardly in a radial direction of the through-hole 16a.

As described above, because the planar portions 16b are present between the two semicircular curved surface portions 16c, the through-hole 16a of the lever 16 is a long hole having a longitudinal direction that is parallel to the contact surface 12a of the valve plate 12 and also orthogonal to the center axis of the shaft 15.

Also, as shown in FIG. 4, a portion of the through-hole 16a on the valve plate 12 side has a tapered surface 16d that is inclined more largely as the tapered surface 16d becomes closer to the valve plate 12. A diameter of the valve stem 13 is slightly smaller than a distance between the two planar portions 16b of the through-hole 16a. Although the valve stem 13 is almost columnar, portions facing the planar portions 16b of the through-hole 16a are flat.

Thus, as shown in FIG. 4, in a state where the valve stem 13 is inserted into the through-hole 16a, a gap between each of the planar portions 16b of the through-hole 16a and the valve stem 13 is extremely small. Meanwhile, as shown in FIG. 3, there is a larger gap between each of the curved surface portions 16c of the through-hole 16a and the valve stem 13 than the gap between each of the planar portions 16b of the through-hole 16a and the valve stem 13.

Next, description is given regarding the manufacturing method for the turbocharger 100, especially a method for assembling the wastegate valve 10. As described earlier, the wastegate valve 10 includes the swing arm 14 that is a shaft-side member including the shaft 15, and the valve body 11 including the valve plate 12 and the valve stem 13.

Figure 5:
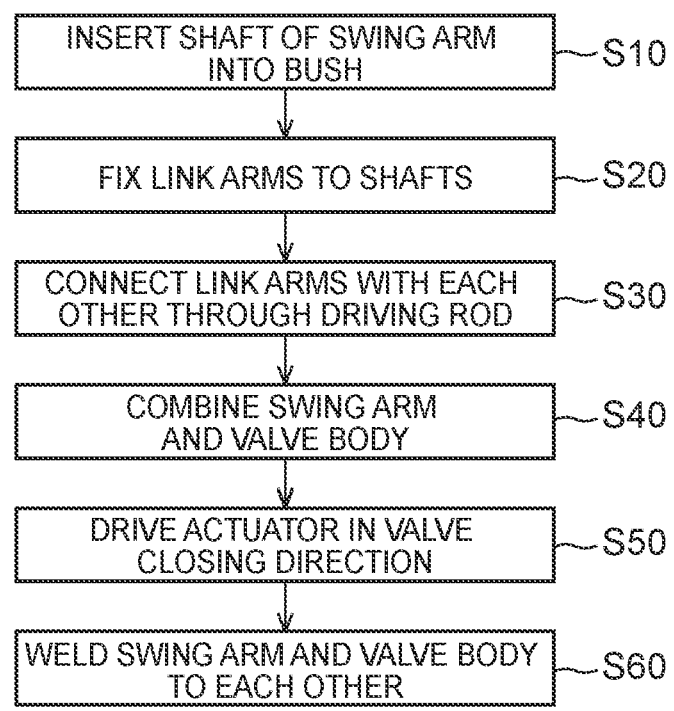
FIG. 5 is a flowchart showing a process flow for assembly of the wastegate valve.

When the wastegate valve 10 is assembled, first of all, the swing arm 14 that is not yet combined with the valve body 11 is attached to the turbine housing 130. Specifically, as shown in FIG. 5, as a process in step S10, the shaft 15 of the swing arm 14 is inserted into the bush that is fitted into the turbine housing 130.

Then, as a process in step S20, the wastegate-side link arm 25 is fixed to the small diameter portion 15b of the shaft 15 that projects to the outer side of the turbine housing 130. The wastegate-side link arm 25 is provided with the through-hole into which the small diameter portion 15b of the shaft 15 is fitted. As the small diameter portion 15b is welded in a state where the small diameter portion 15b is fitted into the through-hole, the wastegate-side link arm 25 is fixed to the shaft 15.

Next, as a process in step S30, the link arms 23, 25 are connected with each other through the driving rod 28. Specifically, the first end of the driving rod 28 is assembled to the wastegate-side link arm 25 by inserting the connecting pin 26 into the through-hole, and the E-ring 24 is fitted into the groove of the connecting pin 26 so as to retain the first end of the driving rod 28. Also, the second end of the driving rod 28 is assembled to the actuator-side link arm 23 by inserting the connecting pin 26 into the through-hole, and the E-ring 24 is fitted into the groove of the connecting pin 26 so as to retain the second end of the driving rod 28. Thus, the link arms 23, 25 are connected with each other by the driving rod 28 and driving force of the actuator 20 is transmitted to the swing arm 14.

Next, as a process in step S40, the swing arm 14 and the valve body 11 are combined. Specifically, the valve stem 13 of the valve body 11 is inserted into the through-hole 16a of the swing arm 14. In this stage, the swing arm 14 and the valve body 11 are not fixed to each other, and thus allowed to move relative to each other.

Next, as a process in step S50, the actuator 20 is driven in a valve closing direction. In other words, the actuator 20 is driven in a direction of closing the wastegate valve 10.

Figure 6:
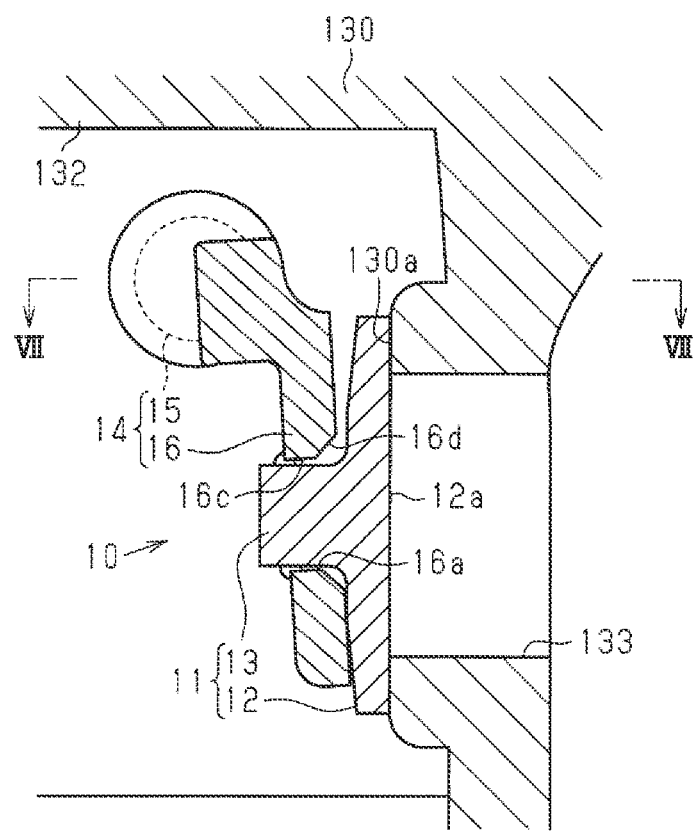
FIG. 6 is an enlarged sectional view of the wastegate port and its vicinity.
Figure 7:
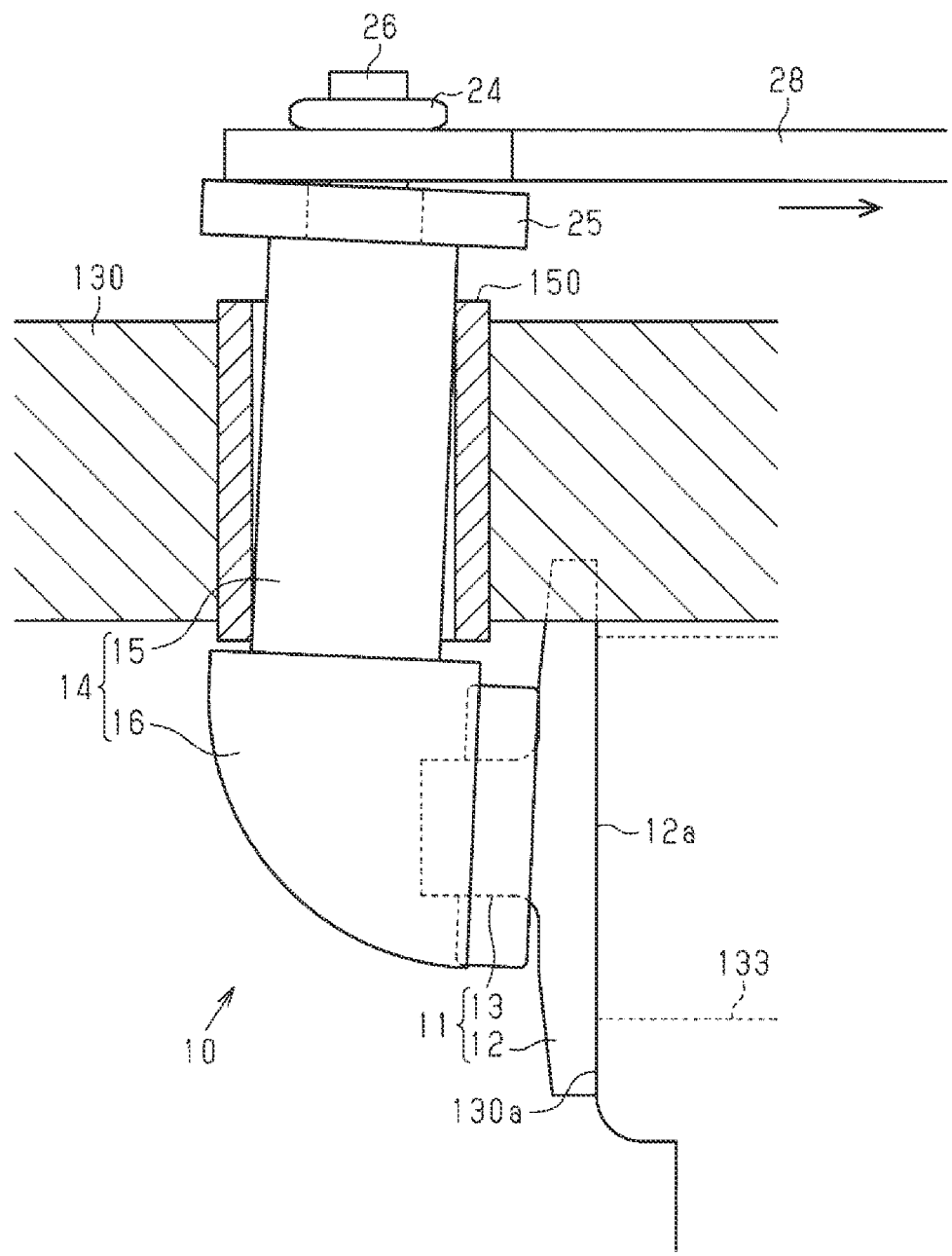
FIG. 7 is a sectional view taken along the arrows VII-VII in FIG. 6.

As shown in FIG. 6 and FIG. 7, by driving the actuator 20 in the valve closing direction as described above, the contact surface 12a of the valve plate 12 comes into contact with the bearing surface 130a, and the valve plate 12 is thus pressed against the bearing surface 130a so that the valve plate 12 closes the wastegate port 133. FIG. 6 is a sectional view taken in a direction of arrows VI-VI in FIG. 3, and FIG. 7 is a sectional view taken along the arrows VII-VII in FIG. 6.

As stated above, in the wastegate valve 10, the through-hole 16a provided in the lever 16 is a long hole, and a gap is created between each of the curved surface portions 16c of the through-hole 16a and the valve stem 13. Therefore, the valve body 11 of the wastegate valve 10 is able to tilt with respect to the lever 16 of the swing arm 14 at the stage of the process in the step S50.

Thus, as shown in FIG. 6, when the wastegate valve 10 is driven to a valve closing side, the valve body 11 is tilted with respect to the lever 16, and the contact surface 12a of the valve plate 12 comes into close contact with the bearing surface 130a of the turbine housing 130. Thus, the valve body 11 closes the wastegate port 133 tightly.

As shown in FIG. 7, the actuator 20 is pulling the driving rod 28 in a direction shown by an arrow. Therefore, when there is a gap between the bush 150 and the shaft 15, the shaft 15 is tilted inside the bush 150.

Next, as a process in step S60, the valve stem 13 of the valve body 11 is welded to the lever 16 in the state where the actuator 20 is driven in the valve closing direction, and the contact surface 12a of the valve body 11 is pressed against the bearing surface 130a as described above. Thus, the swing arm 14 and the valve body 11 are fixed to each other.

In the manufacturing method for the turbocharger, the wastegate valve 10 is assembled through the steps S10 to S60 as described above. Among the processes in the step S10 to S60, the processes in the steps S10 to S30 correspond to a connecting process in which the swing arm 14 is inserted into the bush 150 and is thus connected with the actuator 20, and the process in the step S40 corresponds to a combining process in which the swing arm 14 and the valve body 11 are combined. The process of the step S60 corresponds to a fixing process in which the swing arm 14 and the valve body 11 are fixed to each other.

Next, actions and effects of the manufacturing method are described. (1) In the manufacturing method, the wastegate valve 10 arranged in the turbine housing 130 through the connecting process (step S10 to step S30) and the combining process (step S40) is driven by the actuator 20 to the valve closing side (step S50). Then, the fixing process (step S60) is carried out in the state where the contact surface 12a of the valve body 11 is pressed against the bearing surface 130a. With the manufacturing method, the shaft 15 is tilted inside the bush 150 as the actuator 20 is driven, and the swing arm 14 and the valve body 11 are fixed to each other in the state where the contact surface 12a of the valve body 11 is pressed against the bearing surface 130a. Therefore, the swing arm 14 and the valve body 11 are fixed to each other in the same positions as those when actuator 20 is driven to close the wastegate valve 10. Accordingly, even if there were gaps among parts including the gap between the bush 150 and the shaft 15, and manufacturing tolerance, it is possible to assemble the wastegate valve 10 in a state where gaps thus caused are eliminated. As a result, it is possible to manufacture the turbocharger 100 that is able to close the wastegate port 133 tightly in an actual usage state.

The foregoing embodiment may be modified as follows and carried out. The embodiment and modified examples below may be combined with one another and carried out unless there is technical inconsistency.

The order of the combining process and the connecting process may be changed. In other words, the combining process (step S40) may be carried out first, and then the connecting process (step S10 to step S30) may be carried out in a state where the swing arm 14 and the valve body 11 are combined.

In the embodiment, the wastegate valve 10 is made of two members, the shaft-side member is the swing arm 14, and the valve body-side member is the valve body 11 itself. However, the manufacturing method may also be applied to a wastegate valve in which the valve body-side member is a member in which the valve body 11 and the lever 16 are integrated, and the shaft-side member is the shaft 15 only. This means that the manufacturing method only needs to include the connecting process in which the shaft-side member is inserted into the bush 150 and thus connected with the actuator 20, the combining process in which the shaft-side member is combined with the valve body-side member, and the fixing process in which the shaft-side member and the valve body-side member are fixed to each other. The same effects as (1) stated above are obtained as long as the wastegate valve 10 that is arranged in the turbine housing 130 through the connecting process and the combining process is driven by the actuator 20 to the valve closing side, and then the fixing process is carried out in the state where the contact surface 12a of the valve body 11 is pressed against the bearing surface 130a.

Further, the shaft-side member may be a member in which the wastegate-side link arm 25 and the shaft 15 are integrated. However, in a case of a structure in which the shaft 15 is fixed to the valve body-side member, torque caused by pressure of exhaust gas that flows in the wastegate port 133 when the wastegate valve 10 is open acts as stress that shears a fixing portion between the lever 16 and the shaft 15.

On the contrary, as described in the embodiment above, with the structure in which the wastegate valve 10 is divided into the swing arm 14 and the valve body 11, and the valve stem 13 is inserted into the through-hole 16*a* of the lever 16 so that the swing arm 14 and the valve body 11 are combined, pressure of exhaust gas acts in a direction of pressing the valve plate 12 against the lever 16. Therefore, stress caused by pressure of exhaust gas is dispersed instead of concentrating only on a fixing portion between the lever 16 and the valve stem 13. Therefore, compared to the structure in which the shaft 15 is fixed to the valve body-side member, durability is improved.

The actuator 20 does not need to be an electric actuator 20. For example, the actuator 20 may be an actuator driven by use of pneumatic pressure, or an actuator driven by use of hydraulic pressure.

The technical idea that is understood from the embodiment and the modified examples is described. A turbocharger includes a wastegate valve that opens and closes a wastegate port, and an actuator that drives the wastegate valve. In the turbocharger, the wastegate valve includes a valve body and a swing arm. The valve body is made of a valve plate and a valve stem. The valve plate comes into contact with a bearing surface of a turbine housing and closes the wastegate port, and the valve stem is provided in a back surface of the valve plate. The back surface is on the opposite side of the valve plate from a contact surface that comes into contact with the bearing surface. The swing arm is made of a shaft and a lever. The shaft is supported by a bush provided in a turbine housing so that the shaft is able to revolve, and the lever has a through-hole into which the valve stem is inserted. The valve stem that is inserted into the through-hole, and the lever are fixed to each other at positions when the actuator is driven so that the wastegate valve closes the wastegate port.

What is claimed is:

1. A manufacturing method for a turbocharger, the turbocharger including a wastegate valve that includes a shaft-side member and a valve body-side member, the shaft-side member including a shaft supported by a bush provided in a turbine housing so that the shaft is able to revolve, the valve body-side member including a valve body that sits on a bearing surface of the turbine housing and closes a wastegate port, in which the wastegate valve is configured to open and close as the shaft-side member is driven by an actuator that is provided outside the turbine housing, the manufacturing method comprising:

connecting the shaft-side member to the actuator while the shaft-side member is inserted into the bush;
   combining the shaft-side member with the valve body-side member; and
   fixing the shaft-side member to the valve body-side member in a state where the wastegate valve is driven by the actuator so as to close the wastegate valve, and a contact surface of the valve body is pressed against the bearing surface.

2. The manufacturing method according to claim 1, wherein:
   the shaft-side member includes a lever that is connected with the shaft and has a hole;
   the valve body has a valve stem; and
   when combining the shaft-side member with the valve body-side member, the valve stem is inserted in the hole of the lever.

3. The manufacturing method according to claim 1, wherein:
   the valve body-side member includes a lever and the valve body; and
   when combining the shaft-side member with the valve body-side member, the shaft-side member is combined with the lever.

* * * * *